United States Patent
Taylor et al.

(10) Patent No.: US 7,972,580 B2
(45) Date of Patent: Jul. 5, 2011

(54) METHODS AND COMPOSITIONS FOR THE REMOVAL OF IMPURITIES AND WATER FROM THE BAYER PROCESS

(75) Inventors: Matthew Taylor, New York, NY (US); Douglas J. Harris, Stamford, CT (US); Haunn-Lin Tony Chen, Darien, CT (US); Violina Cocalia, Stamford, CT (US)

(73) Assignee: Cytec Technology Corp., Wilmington, DE (US)

( * ) Notice: Subject to any disclaimer, the term of this patent is extended or adjusted under 35 U.S.C. 154(b) by 76 days.

(21) Appl. No.: 12/341,107

(22) Filed: Dec. 22, 2008

(65) Prior Publication Data

US 2009/0169447 A1  Jul. 2, 2009

Related U.S. Application Data

(60) Provisional application No. 61/017,185, filed on Dec. 28, 2007.

(51) Int. Cl.
 *C01F 1/00* (2006.01)
(52) U.S. Cl. ..................................... 423/130
(58) Field of Classification Search .................. 423/130
 See application file for complete search history.

(56) References Cited

U.S. PATENT DOCUMENTS

| | | | |
|---|---|---|---|
| 4,036,931 A | 7/1977 | Robertson et al. | |
| 4,164,375 A * | 8/1979 | Allen | 366/337 |
| 4,275,042 A | 6/1981 | Lever | |
| 4,280,987 A | 7/1981 | Yamada et al. | |
| 4,496,524 A | 1/1985 | Bush et al. | |
| 4,559,203 A | 12/1985 | Bauer et al. | |
| 4,578,255 A | 3/1986 | Roe et al. | |
| 4,902,425 A | 2/1990 | Keeney | |
| 5,284,634 A | 2/1994 | Strominger et al. | |
| 5,385,586 A * | 1/1995 | Farquharson et al. | 23/305 A |
| 5,849,172 A | 12/1998 | Allen et al. | |
| 5,879,556 A * | 3/1999 | Hein | 210/634 |
| 5,948,263 A * | 9/1999 | Chaiko et al. | 210/634 |
| 6,293,973 B1 | 9/2001 | Farquharson et al. | |
| 7,067,106 B2 | 6/2006 | Malito | |

FOREIGN PATENT DOCUMENTS

| | | |
|---|---|---|
| WO | WO 97/22556 | 6/1997 |
| WO | WO 2007/066143 A2 | 6/2007 |
| WO | WO 2007/066143 A3 | 6/2007 |

OTHER PUBLICATIONS

B.J. Foster and M.L. Roberson, "Removal of HMW Compounds by Partial Wet Oxidation," Light Metals, (1988), pp. 79-85; Phoenix AZ.
A.D. Stuart, "Removal of Organics from Bayer Spent Liquors Using Manganese Dioxide," 117th TMS Light Metals Committee (1988), pp. 95-102; Phoenix, AZ.
N. Brown, "Kinetics of Copper-Catalysed Oxidation of Bayer Liquor Organics," Light Metals (1989), pp. 121-130.
P.J. The and J.F. Bush, "Solubility of Sodium Oxalate in Bayer Liquor and a Method of Control," Light Metals (1987), pp. 5-10.
J. Bangun and A. A. Adesina, "The Photodegradation Kinetics of Aqueous Sodium Oxalate Solution Using TiO2 Catalyst," Applied Catalysis A: Gen.175 (1998), pp. 221-235.
Tran et al., "Oxidation of Organics in Simulated Bayer Liquors Using Maganese Dioxide Ore," Light Metals, (1989), pp. 217-223.
Yamada et al., "Oxidation of Organic Substances in the Bayer Process," Light Metals (1981), pp. 117-128.
Williams et al., "Enhanced Oxalate Removal Utilizing the Multi-Functional Purox Process," Light Metals (1998), 81-87.
Pulpeiro, et al., "Sizing an Organic Control System for the Bayer Process," Light Metals (1998), pp. 89-95.
Farquharson et al., "Development of an Effective Liiiiquor Oxalater Stabilizer," Light Metals (1995), pp. 95-101.
Hollanders et al., "Calcination of Sodium Oxalate/Bauxite Mixtures," Light Metals (1994), pp. 91-97.
S. Kumar, "Incineration of Sodium Oxalate/Fuel Oil Slurry in a Rotary Calciner," Light Metals (1991), pp. 1229-1234.
Perrotta et al., "Hydrocalumite Formation in Bayer Liquor and Its Promotional Effect on Oxalate Precipitation," Light metals (1995), pp. 77-87.
Perrotta et al., "Layered Duble Hydroxide Formation in Bayer Liquor and Its Promotional Effect on Oxalate Precipitation," Light Metals (1996), pp. 17-28.
Shibue et al., "Liquor Burning Process—Its Modification and Increase in Capacity," Light Meyals (1990), pp. 35-40.
Pareek et al., "Photocausticization of Spent Bayer Liquor: a Pilot-Scale Study," Advances in Enivronmental Research 7 (2003) pp. 411-420.
Misato Hironaka, et al., Kinetics of Lactic Acid Extraction with Quaternary Ammonium Salt, Separation Science and Technology, 36(13), 2927-2943 (2001).
Atkins and Grocott, Light Met., (1993), 151.
Cousineu and The, Light Met., (1991), 139.

* cited by examiner

*Primary Examiner* — Melvin C Mayes
*Assistant Examiner* — Melissa Stalder
(74) *Attorney, Agent, or Firm* — Elizabeth Galletta; Charles E. Bell

(57) ABSTRACT

A liquid phase that comprises an oxalate-extracting amount of an organic salt is useful as an extractant in a liquid/liquid extraction process for purifying Bayer process streams.

53 Claims, No Drawings

METHODS AND COMPOSITIONS FOR THE REMOVAL OF IMPURITIES AND WATER FROM THE BAYER PROCESS

The present application claims priority to the provisional application Ser. No. 61/017185 filed Dec. 28, 2007, the entirety of which is hereby incorporated by reference.

BACKGROUND

1. Field of the Invention

This invention relates generally to methods and compositions for treating Bayer process streams. More particularly, it relates to solvent extraction methods that utilize an organic salt to remove undesired constituents (such as oxalate) from Bayer process streams.

2. Description of the Related Art

The almost universally used process for the manufacture of alumina is the Bayer Process. In a typical commercial Bayer Process, raw bauxite is pulverized to a finely divided state. The pulverized ore is then fed to a slurry mixer where a slurry is prepared using spent liquor and added caustic. This bauxite slurry is then diluted and sent through a series of digesters where, at about 300°-800° F. and 100-2000 p.s.i., about 98% of the total available alumina is extracted from the ore which may contain both trihydrate and monohydrate forms of alumina. The effluent from the digesters passes through a series of flash or blow-off tanks wherein heat and condensate are recovered as the digested slurry is cooled to about 230° F. and brought to atmospheric pressure. The aluminate liquor leaving the flashing operation typically contains about 1-20% solids, which include the insoluble residues that remain after reaction between the bauxite ore and basic material used to digest the ore and the insoluble components which precipitate during digestion.

The coarser solid particles are generally removed with a "sand trap" cyclone. To separate the finer solid particles from the liquor, the slurry is typically fed to the center well of a mud settler (also called a decanter, a residue thickener or a raking thickener) where it is treated with a flocculant. As the mud settles, clarified sodium aluminate solution, referred to as "green" or "pregnant" liquor, overflows a weir at the top of the mud settling tank and is passed to subsequent processing steps. The settled solids ("red mud") are withdrawn from the bottom of the mud settler and passed through a countercurrent washing circuit (called "the washer train") for further recovery of sodium aluminate and soda. Aluminate liquor overflowing the settler (settler or thickener overflow) still contains various impurities, both dissolved and undissolved, including typically 50 to 200 mg of undissolved suspended solids per liter. This liquor is then generally further clarified by filtration to remove undissolved suspended solids to give a filtrate with about 10 mg or less of undissolved suspended solids per liter of liquor. Alumina, in relatively pure form, is then precipitated from the filtrate as alumina trihydrate crystals. The remaining liquid phase or spent liquor may be concentrated to form "strong" liquor, from which additional alumina trihydrate may be precipitated and from which additional spent liquor may be generated. The spent liquor streams are typically returned to the initial digestion step and employed as a digestant of additional ore after being reconstituted with additional caustic.

Bauxite ore generally contains organic and inorganic impurities, the amounts of which are specific to the bauxite source. During the early stages of digestion, Bayer liquor contains a wide variety of organic compounds including polybasic acids, polyhydroxy acids, alcohols and phenols, benzenecarboxylic acid, humic and fulvic acids, lignin, cellulose, and other carbohydrates. Under alkaline, oxidative conditions such as those existing in the Bayer system these complex organic molecules break-down to form other compounds such as sodium salts of formic, succinic, acetic, lactic and oxalic acids. Predominant among these is sodium oxalate.

Sodium oxalate has a low solubility in caustic solutions and thus, if not adequately controlled, tends to precipitate in an acicular (fine, needle-like) form in regions of the Bayer circuit where there is an increase in causticity or decrease in temperature. These fine sodium oxalate needles can nucleate alumina trihydrate and inhibit its agglomeration, resulting in fine, undesirable gibbsite particles which are difficult to classify and are less than ideal for calcination. The excessive generation of fine particles can lead to blocking of the pores in the filter cloths during filtration of the thickener overflow liquor, hence undesirably decreasing the rate of filtration.

During the calcination stage, oxalate can decompose to leave fragile alumina particles having high sodium content, which in turn can increase the cost of aluminum production and subsequently produce undesirable levels of $CO_2$ emissions. Additionally, due to the formation of sodium oxalate: (1) scale growth may be increased; (2) there may be an increase in liquor boiling point; (3) caustic losses may be observed in the circuit (due to the formation of organic sodium salts); and/or (4) the Bayer liquor viscosity and density may be increased, resulting in increased material transport costs.

The presence of oxalate and/or other organic species such as glucoisosaccharinate, gluconate, tartrate, and mannitol may decrease gibbsite precipitation yield. The presence of gluconate may reduce gibbsite growth rate. The presence of humic substances in Bayer liquor is common. Due to their surfactant nature, medium and high molecular weight humic substances are often responsible for liquor foaming and interference with red mud flocculation. High levels of organic material in Bayer liquor may also result in a decrease in coagulation efficiency and supernatant clarity during the red mud circuit. Alumina trihydrate containing high levels of organic matter also tends to produces a final product having an undesirably high level of coloration and/or impurity level.

As the Bayer process is cyclic, organic matter entering the process stream tends to accumulate with each cycle of the process, with steady state impurity concentration determined by process input and output streams. The major organic exits are the red mud circuit with the gibbsite product, via oxidation to carbon dioxide or carbonate and via any organic removal steps in place.

Methods of dealing with the organic impurity problem have been discussed. See, e.g.,: Foster and Roberson, Light Met., (1988), 79; U.S. Pat. No. 7,067,106; Tran et al., Light Met., (1986), 217; Stuart, Light Met., (1988), 95; Yamada et al., Light Met., (1981), 117; Brown, Light Met., (1989), 121; U.S. Pat. No. 4,280,987; Shibue et al., Light Met., (1990), 35; Kumar, Light Met., (1991), 1229; Hollanders and Boom, Light Met., (1994), 91; Perrotta and Williams, Light Met., (1995), 77; Perrotta and Williams, Light Met., (1996), 17; Williams and Perrotta, Light Met., (1998), 81; U.S. Pat. No. 4,496,524; The and Bush, Light Met, (1987), 5; Pulpeiro et al., Light Met., (1998), 89; Farquharson et al., Light Met., (1995), 95; U.S. Pat. No. 5,385,586; U.S. Pat. No. 4,036,931; Bangun and Adesina, App. Catalysis A: Gen., (1998), 175: 221; Pareek et al., Adv. Environ. Res., (2003), 7:411; WO 97/22556; Atkins, and Grocott, Light Met., (1993), 151; Cousineau and The, Light Met., (1991), 139; U.S. Pat. No. 4,902,425; U.S. Pat. No. 5,284,634; WO 07/066143. However, despite these efforts, a long-felt need exists for improved methods of removing impurities from Bayer process streams.

SUMMARY OF THE INVENTION

In an embodiment, a method of purifying a Bayer process stream is provided. The method comprises providing a liquid phase that comprises an oxalate-extracting amount of an organic salt, wherein the organic salt comprises a quaternary organic cation, and wherein the liquid phase is at least partially immiscible with the Bayer process stream. The Bayer process stream is intermixed with the liquid phase in an amount effective to form a biphasic liquid/liquid mixture, wherein the biphasic liquid/liquid mixture comprises a primarily Bayer process phase and a primarily organic salt phase. The primarily Bayer process phase is at least partially separated from the primarily organic salt phase to form a separated primarily Bayer process phase and a separated primarily organic salt phase. In the method the intermixing is effective to reduce the concentration of oxalate in the Bayer process stream.

In another embodiment, a composition is provided comprising a biphasic liquid/liquid mixture, wherein the biphasic liquid/liquid mixture comprises a primarily Bayer process phase and a primarily organic salt phase, and wherein the organic salt phase comprises an oxalate-extracting amount of a quaternary organic cation These and other embodiments are described in greater detail below.

DETAILED DESCRIPTION

Various embodiments described herein relate to compositions and methods of purifying a Bayer process stream. A Bayer process stream is a liquid stream generated during the Bayer process and includes the various Bayer process streams mentioned above, including thickener overflow, pregnant liquor, spent liquor and strong liquor streams. In general terms, the purification methods described herein are liquid/liquid extractions that involve extracting undesired constituents (e.g., oxalate) from a Bayer process stream by intermixing with an extractant that is at least partially immiscible with the Bayer process stream, then separating the resultant phases. It has been found that liquid extractants that contain an organic salt are highly effective for extracting undesired impurities. The methods described herein may be implemented in the form of an impurity removal unit operation that is added to the Bayer process at any point after thickener through to digestion, with the preferred location being directly after the final alumina trihydrate precipitation stage. Examples of impurities that may be removed include, but are not limited to, organic species (e.g., oxalate, formate, acetate and humates) and/or inorganic species (e.g., those that decrease the alumina trihydrate purity such as chloride, sulfate, gallium oxides and/or gallium hydroxides). In addition to removing the undesirable anionic impurities from the process, the caustic (OH$^-$) concentration can be increased in the Bayer liquor through anion exchange during the impurity extraction, creating additional economic benefit to the end-user. For example, water may be removed from the Bayer process stream may be extracted into the liquid phase, particularly when the cationic organic salt is associated with significant amounts of hydroxide anions. The phases can then be separated, thereby reducing the level of water in the Bayer process stream.

Organic and/or inorganic impurities from a Bayer stream can be extracted into the extractant liquid phase. For example, in an embodiment in which the cationic salt is tetrabutylammonium hydroxide, about 48.2 weight percent of oxalate/succinate and about 85.6, 91.7, and 96.1 weight percent of acetate, formate, and chloride ions, respectively may be removed from Bayer liquor. The total organic carbon content (TOC) may be reduced by about 63.0 weight percent in Bayer liquor. Also, a strong visual reduction in the color of the Bayer Liquor after contact with the quaternary organic cation-rich solution may be observed. In another embodiment in which the cationic salt is tetrabutylphosphonium hydroxide, about 53.38 weight percent of oxalate/succinate, 83.93, 91.93, 96.48 weight percent of acetate, formate, and chloride ions, respectively, may be removed from a Bayer liquor. The TOC content in the Bayer liquor may be reduced by about 67.7 weight percent.

An embodiment provides a method of purifying a Bayer process stream that comprises providing a liquid phase that comprises an oxalate-extracting amount of an organic salt and intermixing the Bayer process stream with the liquid phase in an amount effective to form a biphasic liquid/liquid mixture. The organic salt comprises a quaternary organic cation, and the liquid phase is at least partially immiscible with the Bayer process stream. The resulting biphasic liquid/liquid mixture contains a primarily Bayer process phase and a primarily organic salt phase. Separation of the primarily Bayer process phase from the primarily organic salt phase forms a separated primarily Bayer process phase and a separated primarily organic salt phase. The intermixing of the oxalate-extracting amount of an organic salt with the Bayer process stream is effective to reduce the concentration of oxalate in the Bayer process stream. This invention is not bound by theory of operation, but it is believed that extraction of water and impurities (such as oxalate) from the Bayer process stream into the liquid phase with which it is intermixed is facilitated by the mixing conditions and the presence of the organic salt in the liquid phase. In some embodiments the intermixing is also effective to reduce the concentration of one or more other impurities in the Bayer process stream, such as an inorganic impurity (e.g., chloride), The liquid phase extractant contains an organic salt that comprises a quaternary organic cation. Examples of suitable organic salts are described herein and include so-called "ionic liquids." Examples of quaternary organic cations include phosphonium, ammonium, imidazolium, pyrrolidinium, quinolinium, pyrazolium, oxazolium, thiazolium, isoquinolinium, and piperidinium. Those skilled in the art will understand that the foregoing examples of quaternary organic cations encompass susbstituted versions thereof, including the following:

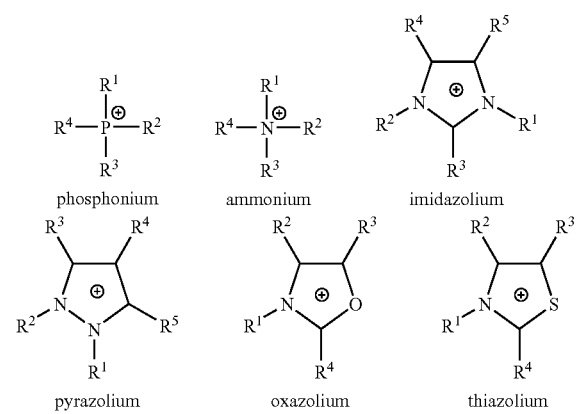

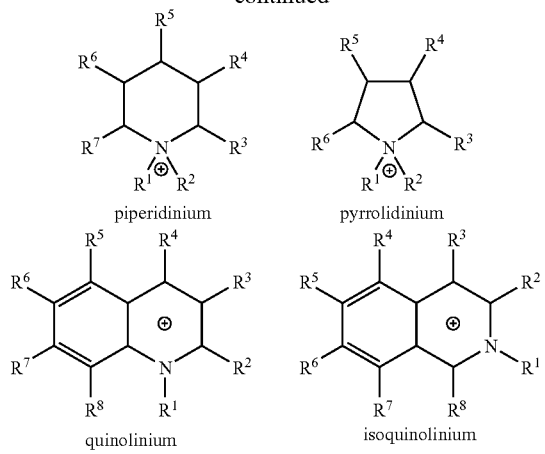

piperidinium    pyrrolidinium quinolinium    isoquinolinium wherein $R^1$ through $R^8$ are each independently selected from a hydrogen, or an optionally substituted $C_1$-$C_{50}$ alkyl group, where the optional substituents include one or more selected from alkyl, alkenyl, alkynyl, alkoxyalkyl, carboxylic acid, alcohol, carboxylate, hydroxyl, and aryl functionalities. $R^1$ through $R^8$ each individually comprise from about 1 to about 50 carbon atoms, e.g., from about 1 to about 20 carbon atoms.

The "alkyl" term as used herein can be branched or unbranched hydrocarbon group comprising of 1 to 50 carbon atoms (i.e., methyl, ethyl, n-propyl, isopropyl, n-butyl, isobutyl, t-butyl, pentyl, hexyl, heptyl, octyl, nonyl, decyl, dodecyl, tetradecyl, hexadecyl, etc.). The alkyl group can be unsubstituted or substituted with one or more substituents including, but not limited to, alkyl, alkoxy, alkenyl, halogenated alkyl, alkynyl, aryl, heteroaryl, aldehyde, ketone, amino, hydroxyl, carboxylic acid, ether, ester, thiol, sulfo-oxo, silyl, sulfoxide, sulfonyl, sulfone, halide, or nitro, as described below. The term "alkyl" is generally used to refer to both unsubstituted alkyl groups and substituted alkyl groups; the substituted alkyl groups used herein are described by referring to the specific substituent or substituents. For instance, "alkylamino" describes an alkyl group that is substituted with one or more amino groups, as described below. The term "halogenated alkyl" describes an alkyl group that is substituted with one or more halide (e.g., fluorine, chlorine, bromine, or iodine). When "alkyl" is used in one case and a specific term such as "alkylalcohol" is used in another, it is not meant to suggest that the term "alkyl" does not also refer to specific terms such as "alkylalcohol" and the like. When using a general term such as "alkyl" and a specific term such as "alkylalcohol" it is not implied that the general term does not also include the specific term. This practice is also used for other terms described herein.

The term "alkoxy" denotes an alkyl group bound through a single, terminal ether linkage. The "alkenyl" is a substituted or unsubstituted hydrocarbon group comprising 2 to 50 carbon atoms which contains at least one carbon-carbon double bond. The "alkenyl" term includes any isomers in which the compound may exist. The alkenyl group can be substituted with one or more groups including, but not limited to, alkyl, alkoxi, alkenyl, halogenated alkyl, alkynyl, aryl, heteroaryl, aldehyde, ketone, amino, hydroxyl, carboxylic acid, ether, ester, thiol, sulfo-oxo, silyl, sulfoxide, sulfonyl, sulfone, halide, or nitro, as described below.

The term "halogenated alkyl" as used herein is an alkyl group which is substituted with at least one halogen (e.g., fluoride, chloride, bromide, iodide). The halogenated alkyl can also be unsubstituted, or substituted with one or more groups including, but not limited to, alkyl, alkoxy, alkenyl, halogenated alkyl, alkynyl, aryl, heteroaryl, aldehyde, ketone, amino, hydroxyl, carboxylic acid, ether, ester, thiol, sulfo-oxo, silyl, sulfoxide, sulfonyl, sulfone, halide, or nitro, as described below.

The term "alkynyl" denotes a substituted or unsubstituted hydrocarbon group comprising of 2 to 50 carbon atoms which contains at least one carbon-carbon triple bond. The alkenyl group can be substituted with one or more groups including, but not limited to, alkyl, alkoxi, alkenyl, halogenated alkyl, alkynyl, aryl, heteroaryl, aldehyde, ketone, amino, hydroxyl, carboxylic acid, ether, ester, thiol, sulfo-oxo, silyl, sulfoxide, sulfonyl, sulfone, halide, or nitro, as described below.

The "aryl" term is a hydrocarbon group that comprises of one or more aromatic rings including, but not limited to phenyl, naphtyl, biphenyl, and the like. The term includes "heteroaryl" which is an aromatic group that contains at least one heteroatom within the aromatic ring. A heteroatom can be, but not limited to, oxygen, nitrogen, sulfur, and phosphorus. The aryl group can be unsubstituted, or substituted with one or more groups including, but not limited to, alkyl, alkoxy, alkenyl, halogenated alkyl, alkynyl, aryl, heteroaryl, aldehyde, ketone, amino, hydroxyl, carboxylic acid, ether, ester, thiol, sulfo-oxo, silyl, sulfoxide, sulfonyl, sulfone, halide, or nitro.

The term "aldehyde" refers to a —(CO)H group (where (CO) represents C=O). The term "ketone" refers to a $R_x$(CO)$R_y$ group, where $R_x$ and $R_y$ can each independently be an alkyl, alkoxy, alkenyl, alkynyl, or aryl, bound to the (CO) group through carbon-carbon bonds. The term "amine" or "amino" refers to a NRaRbRc group, where Ra, Rb, and Rc can each independently be hydrogen, an alkyl, alkoxi, alkenyl, alkynyl, or aryl. The term "hydroxyl" refers to an —OH group. The term "carboxylic acid" refers to a —(CO)OH group.

Examples of quaternary organic cations include trihexyltetradecylphopshonium, tetrabutylphosphonium, tetradecyl (tributyl)phosphonium, 1-Butyl-3-methylimidazolium, tributylmethylammonium, tetrapentylammonium, dimethyl dicoco quaternary ammonium stearamidopropyldimethyl-2-hydroxyethylammonium, ethyltetradecyldiundecyl ammonium tallowalkyltrimethyl ammonium, tetrahexylammonium, butylmethylpyrrolidinium, N,N,N-trimethyl-1-dodecanaminium benzyldimethylcocoalkylammonium, N,N-dimethyl-N-dodecylglycine betaine, 1-octyl-2,3-dimethylimidazolium, tetrabutylammonium, tributyl-8-hydroxyoctylphosphonium, sulfonium and guanidinium. Preferred cations are phosphonium, ammonium, pyrrolidinium and imidazolium.

The quaternary organic cation of the cationic organic salt is typically associated with an anionic counterion or anion. Examples of suitable anions include inorganic anions and organic anions. The anion may a chaotropic anion or a kosmotropic anion. Examples of suitable anions include halide (e.g., fluoride, chloride, bromide, iodide), hydroxyl, alkylsulfate (e.g., methylsulfate, ethylsulfate, octylsulfate), dialkylphosphate, sulfate, nitrate, phosphate, sulfite, phosphate, nitrite, hypochlorite, chlorite, perchlorate, bicarbonate, carboxylate (e.g., formate, acetate, propionate, butyrate, hexanoate, fumarate, maleate, lactate, oxalate, pyruvate), bis(trifluoromethylsulfonyl)imide ([NTF$_2$]$^-$), tetrafluoroborate, and hexafluorophosphate.

The organic salt may comprise any pairing of the quaternary organic cations and anions described herein or generally known in the art. Examples of suitable organic salts include AMMOENG 101®, AMMOENG 110®, trihexyltetradecylphopshonium chloride (Cyphos IL 101®, Cytec Industries, Inc. W. Paterson, N.J.), tetrabutylphosphonium chloride (Cyphos IL 164®, Cytec Industries, Inc. W. Paterson, N.J.), tetradecyl(tributyl)phosphonium chloride (Cyphos IL 167®), 1-Butyl-3-methylimidazolium chloride ([$C_4$mim] Cl), tetrabutylammonium hydroxide ([$(C_4)_4$N][OH]), tetrabutylammonium chloride ([$(C_4)_4$N]Cl), tributylmethylammonium hydroxide ([$(C_4)_3(C_1)$N][OH]), tetrapentylammonium hydroxide ([$(C_5)_4$N][OH]), Adogen 462® (dimethyl dicoco quaternary ammonium chloride), Cyastat SN® (Stearamidopropyldimethyl-2-hydroxyethylammonium nitrate), ethyltetradecyldiundecyl ammonium chloride, Arquad T-50® (Tallowalkyltrimethyl ammonium chloride), tetrahexylammonium bromide, butylmethylpyrrolidinium bis(trifluoromethylsulfonyl)imide, Arquad 12-50H® (N,N,N-Trimethyl-1-dodecanaminium chloride), Arquad DMCB-80® (Benzyldimethylcocoalkylammonium chloride), EMPIGEN BB® detergent (N,N-dimethyl-N-dodecylglycine betaine), 1-Octyl-2,3-dimethylimidazolium chloride, 10 wt % tetrabutylammonium hydroxide dissolved in PEG 900, Aliquat® HTA-1, tributyl-8-hydroxyoctylphosphonium chloride, and tetrabutylphosphonium hydroxide.

AMMOENG 101® is represented by the following formula:

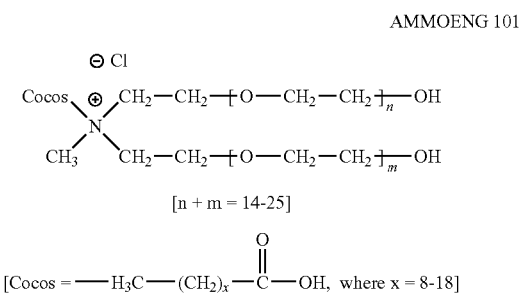

AMMOENG 101

AMMOENG 110® is represented by the following formula:

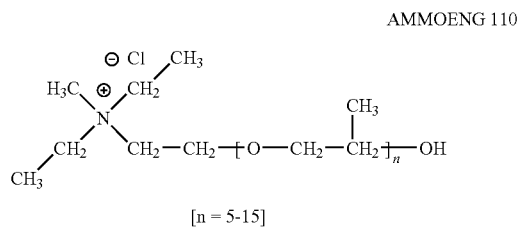

AMMOENG 110

ADOGEN 462® is represented by the following formula:

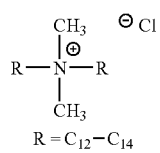

In an embodiment, the liquid phase extractant comprises an oxalate-extracting amount of an organic salt. Such oxalate-extracting amounts may be determined by routine experimentation informed by the guidance provided herein. The liquid phase extractant may comprise various amounts of the organic salt, (e.g., about 2% or greater, about 3% or greater, from about 3% to about 100%, about 5% or greater), by weight based on total weight of the liquid phase. The liquid phase may be an aqueous liquid phase. For example, in an embodiment the liquid phase comprises from about 1% to about 97% water, by weight based on total weight of aqueous liquid phase. The liquid phase may also contain diluents such as alcohols (e.g., isopropanol), polyols and/or polyethyleneoxide. Such diluents may facilitate phase separation and/or inhibit gibbsite crystallization. Various amounts of diluents may be included in the liquid phase (e.g., from about zero to about 90%, about 0 to about 70%), by weight based on total weight of liquid phase. The liquid phase may also further comprise a solvent. Solvents useful in the liquid phase include, but are not limited to, aromatic hydrocarbons, some examples of which include toluene, benzene and derivatives thereof and light aromatic hydrocarbon oil (SX-12); aliphatic alcohols, some examples of which include 1-hexanol, 1-heptanol, 1-octanol and their respective derivatives; aromatic alcohols, examples of which include phenol and derivatives; and halogenated hydrocarbons, examples of which include methylene chloride and chloroform. Various amounts of solvents may be included in the liquid phase (e.g., from about zero to about 90%, about 0 to about 70%), by weight based on total weight of liquid phase.

In some embodiments, the cationic salt can be subjected to pre-extraction treatment. A variety of methods can be utilized to achieve this treatment which results in at least a portion of the quaternary organic cation having hydroxide as a counter anion. For example, pre-extraction Method 1 may be conducted by vigorously mixing 26 wt % NaOH with the organic salt in a ratio in the range of about 1 part organic salt to 4 or 5 parts NaOH solution, by weight. The resulting mixture is then allowed to phase separate for 20 minutes. The upper phase containing the aqueous organic salt is then separated and again contacted with fresh 26 wt % NaOH in a 1:4 weight ratio. This process is repeated 4-5 times. This procedure exchanges the majority of the counter anion for OH$^-$ and pre-equilibrates the water potential to minimize any transfer of water between the extractant liquid phase (containing the organic salt) and the Bayer process liquor. Pre-extraction Method 2 is conducted in a manner similar to Method 1, except that the ratio of organic salt to NaOH solution is about 1:2, by weight. Pre-extraction Method 3 is similar to Method 2, except that the organic salt is dissolved in polyethyleneglycol prior to mixing with the NaOH solution and the process is repeated 2 times instead of 4-5. Pre-extraction Method 4 is similar to Method 2, except that the organic salt is dissolved in a solvent prior to mixing with the NaOH solution and the process is repeated 2 times instead of 4-5.

In Pre-extraction Method 5, the quaternary organic cation can be used for separating the impurities from Bayer process directly as received without contacting it with NaOH. During this process, there may be some water transport between the two phases which can be later accounted for. Also, some ion exchange typically takes place between the anionic species in the Bayer process stream and the quaternary organic cation counter anion, the rate and extent of which will depend upon the anion type in competition for exchange.

The amount of liquid phase extractant intermixed with the Bayer process stream is typically an amount that is effective to form a biphasic liquid/liquid mixture. The biphasic liquid/liquid mixture contains a primarily Bayer process phase and a primarily organic salt phase. Although the liquid phase extractant is at least partially immiscible with the Bayer process stream, the degree of miscibility may vary, and thus the relative amounts of liquid phase extractant and Bayer process stream that are intermixed may vary over a relatively broad range. Factors that tend to influence miscibility include temperature, hydroxide content of the Bayer process stream, organic salt content of the liquid phase extractant, and various characteristics of the organic salt itself, such as molecular weight and chemical structure. Commercially useful ratios of Bayer process stream to liquid phase extractant that are effective to form biphasic liquid/liquid mixtures are typically in the range of about 1000:1 to about 1:10, by weight. Routine experimentation informed by the guidance provided herein may be used to identify relative amounts of liquid phase extractant and Bayer process stream that are effective to form biphasic liquid/liquid mixtures.

The Bayer process stream and the liquid phase extractant can be intermixed in various ways, e.g., by batch, semi-continuous or continuous methods. The intermixing can be accomplished by feeding the Bayer process stream and the liquid phase into any suitable equipment that can be used for mixing and phase separation or settling. Examples of mixing and phase separation or settling equipment that may be suitable in particular situations may include but is not limited to continuous mixer/settler units, static mixers, in-line mixers, columns, centrifuges, and hydrocylones. For examples of mixing and phase separation or settling equipment, see U.S. Pat. No. 5,849,172, which is hereby incorporated by reference in its entirety and particularly for the purpose of providing a description of such equipment and methods of using it. Routine experimentation informed by the guidance provided herein may be used to identify and select suitable equipment and operating conditions for particular situations.

The biphasic liquid/liquid mixture, formed by intermixing of the liquid phase extractant with the Bayer process stream, comprises a primarily Bayer process phase and a primarily organic salt phase. Although the Bayer process stream and the liquid phase extractant may be mutually soluble to some extent (and thus each may contain small amounts of the other after intermixing), the two phases are at least partially immiscible with one another and thus the resulting primarily Bayer process phase will typically resemble the parent Bayer process steam, although it will generally contain lower amounts of impurities (such as oxalate) and/or water, as described herein. Likewise the primarily organic salt phase will typically resemble the parent liquid phase extractant, although it will generally contain higher amounts of impurities (such as oxalate) and/or water, as described herein. Therefore, identification of the primarily Bayer process phase and a primarily organic salt phase will generally be readily apparent to those skilled in the art.

The biphasic mixture is typically allowed to phase separate to form the primarily Bayer process phase and a primarily organic salt phase. Separation of the primarily Bayer process phase from the primarily organic salt phase, to form a separated primarily Bayer process phase and a separated primarily organic salt phase, may be conducted in various ways. For example, the mixing apparatus may be configured to readily allow the separation to be accomplished. For example, the biphasic mixture may be formed in a mixing tank having take-off valves at the top and bottom. After mixing is stopped, the primarily Bayer process phase separates from the primarily organic salt phase and each of the layers is drawn off from the mixing tank by the respective top and bottom take-off valves. It is not necessary for mixing to completely stop, as each of the phases may tend to form in respective areas of the tank even during mixing. For an example of mixing and phase separation or settling equipment, see U.S. Pat. No. 5,849,172, which is hereby incorporated by reference in its entirety and particularly for the purpose of providing a description of such equipment and methods of using it. Feeding of the Bayer process stream and the liquid phase can be accomplished by fluid systems including piping and tubing of various diameters. A variety of pumps can be used to move the Bayer process stream and the liquid phase. Pumps may include but are not limited to positive displacement pumps, centrifugal pumps and kinetic pumps. Pumps and valves can be used to regulate the relative feed ratios of the Bayer process stream and the liquid phase thereby controlling the intermixing and impurity removal.

In an embodiment, as a result of the extraction methods described herein, the separated primarily Bayer process phase has a reduced level of at least one impurity present in the parent Bayer process stream. In an embodiment, the separated primarily Bayer process phase has a lower level of at least one impurity selected from oxalate, oxalate, formate, acetate, organic carbon, and chloride, as compared to the parent Bayer process stream. In another embodiment, the separated primarily Bayer process phase has a lower level of water, as compared to the parent Bayer process stream.

In an embodiment, the separation rate of the primarily Bayer process phase from the primarily organic salt phase can be enhanced. For example, separation rate can be enhanced by heating. Heating can be accomplished in various ways. For example, the biphasic mixture may be heated in the mixing tank itself, and transferred to another tank for heating (and optionally for separation). Methods of heating include heat exchangers, which may be used to advantageously capture excess heat from other sources. Examples of heat exchangers include shell and tube heat exchangers, plate heat exchangers, regenerative heat exchangers, adiabatic wheel heat exchangers, fluid heat exchangers and dynamic scraped surface heat exchangers.

Use of the heat exchanger may allow the temperature of the biphasic mixture to be maintained at a particular temperature or raised to a desired temperature, e.g., by heating so as to raise the temperature by about 1° to about 50° C. The rate of separation can be controlled by regulating the temperature of the biphasic mixture as it undergoes separation. This allows for optimization of the Bayer process and increases in the effectiveness of impurity removal In another embodiment, the separated primarily Bayer process phase can be intermixed with a second Bayer process stream. This may be done for various reasons, e.g., to maximize the efficiency of the Bayer process, which is generally continuous. Thus, the methods described herein may be applied to purify a selected portion of a parent Bayer process stream, then the resulting purified Bayer process stream may be re-introduced back into the parent Bayer process stream, thereby lowering the level of impurities in the parent Bayer process stream by dilution.

In another embodiment, the separated primarily Bayer process phase can be cooled to precipitate at least a portion of aluminum hydroxide dissolved therein. Cooling of the separated primarily Bayer process phase can be accomplished in a variety of ways. For example, the heat exchangers mentioned above in the context of heating the biphasic mixture can also be used to remove heat from the separated primarily Bayer process phase and/or the Bayer process stream into which it is introduced, thereby cooling the liquor. Heat exchangers can be placed in at any location in the plant where it is desired to cool the Bayer process liquor.

An embodiment provides an organic salt phase, comprising a quaternary organic cation and at least one organic impurity selected from oxalate, formate, acetate, and organic carbon. The amount of organic impurity may vary over a broad range, e.g., the amount of organic impurity is in the range of about 0.0001% to about 5%, by weight based on total weight of organic salt phase. The amount of quaternary organic cation may be similar to that described elsewhere herein for use in the methods described herein. Even though the organic salt phase contains one or more impurities, it is still useful as a liquid phase extractant in situations in which it contains a lower level of impurities that the Bayer process stream.

For example, in an embodiment, the organic salt phase may be a separated organic salt phase that contains an organic impurity, an inorganic impurity and/or additional water, as a result of the extraction from the Bayer process stream as described herein. For example, in an embodiment, the separated organic salt phase contains oxalate and at least one organic impurity selected from formate, acetate, and organic carbon. The separated organic salt phase may contain various amounts of impurities, depending on the extent of extraction and the level of impurities in the Bayer process phase. In some cases the level of impurities in the separated organic salt phase is relatively low, such that the separated organic salt phase can be used as a liquid phase extraction in the manner described herein. It is not necessary that such an organic salt phase be obtained from a separated organic salt phase, but in many cases such use will be efficient and cost effective.

Amounts of anionic impurities may be determined using anion exchange ion chromatography methods with conductivity detection. Two alternative methods may be used, the isocratic method and the gradient method, as follows:

Isocratic method for oxalate quantification: Samples are diluted 125-fold with DI water and then filtered with PALL Acrodisc 0.2 µm×13 mm PVDF syringe filter into Agilent PP vials with snap caps for chromatographic separation. Oxalate in the samples is separated from its matrix as a single chromatographic peak using a Dionex Ionpac AS4A-SC column (250×4.0 mm, part #043174), a guard column (Dionex Ion-Pac AG4A-SC part #043175), mobile phase of 3.5 mM NaCO$_3$ and 1.7 mM NaHCO$_3$, a Dinoex ASRS-ULTRAII 4 mm anion self-regenerated suppressor, and conductivity detection. Detailed instrument conditions are as follows.

| System: | Dionex ICS-3000 gradient pump system (system 1) |
|---|---|
| Column: | Dionex Ionpac AS4A-SC column, 250 × 4.0 mm, part #043174 |
| Guard column: | Dionex IonPac AG4A-SC part #043175. |
| Mobile phase: | 3.5 mM NaCO$_3$ and 1.7 mM NaHCO$_3$ |
| Flow rate: | 1.5 ml/min |
| Run time: | 20 min |
| Injection volume: | 25 µL |
| Column temperature: | 35° C. on DX-500; 30° C. on ICS-3000 system 1. |
| ASRS current: | 50 mA with recycle mode |
| Conductivity detector: | 35° C. with temp compensation 1.7% ° C. |
| Data collection Rate: | 5.0 Hz |
| Software: | Dionex Chromeleon software version 6.70 |

Quantitative results are obtained by comparing the oxalate peak sizes from the sample and oxalate standard solution. Oxalate standard material from Acros Organic is dissolved in DI water and diluted to several concentration levels. The detection responses of the standard solutions analyzed parallel to the samples are plotted against their concentrations. A linearity concentration range of this plot is set up as working range. Sample quantification is based on the linear line slop. The method precision and accuracy is 1.7% RSD. The method accuracy is 102%. Limit of Detection is 0.2 ppm of sodium oxalate.

Gradient method for the analyses of acetate, formate, chloride, sulfate, phosphate and oxalate/succinate anions: Samples are diluted 125-fold with DI water and then filtered with PALL Acrodisc 0.2 µm×13 mm PVDF syringe filter into Agilent PP vials with snap caps for chromatographic separation. The specified anions are separated and detected using Dionex ICS-3000 Reagent-Free Ion Chromatography (RFIC) system with a Dionex IonPac AS19 column, potassium hydroxide gradient eluent, a Dinoex ASRS-ULTRAII 4 mm anion self-regenerated suppressor, and conductivity detector. To quantitatively determine the anion contents in the samples, external standards with varying concentrations are used to establish the correlation between the concentration and the detector response. Oxalate standard material is obtained from Acros Organic and the others are purchased from Inorganic Ventures. The correlation relationship for the organic anions becomes non-linear (curve up) when the concentration is higher than 50 ppm (mg/L) and that acetate has the narrowest linear range. Therefore, the concentrations of the organic external standards used for quantification are calibrated with respect to the anions concentrations in the samples to account for the non-linear affect, especially for obtaining accurate data in mass balance between Bayer liquor and the removing extractant.

Detailed instrument conditions are as follows.

DIONEX ICS-3000 system 2 with KOH Eluent Generator

Column: DIONEX IonPac AS19, 250×4.0 mm

Guard column: DIONEX IonPac AG19

Column temperature: 30° C.

Ion Suppressor: DIONEX ASRS-ULTRA II, 4 mm; re-cycles; 114 mA.

Detection: Conductivity detector with temperature compensation 1.7% ° C.

Collection Rate: 5.0 Hz

Injection: 25 µL

Flow rate: 1.0 mL/min.

Run time: 30 minutes including post times.

Mobile phase: KOH gradient

| | Time (min) | KOH mM |
|---|---|---|
| Gradient: | 0 | 10 |
| | 3 | 10 |
| | 25 | 50 |
| | 25.1 | 10 |
| | 30 | 10 |

Software: Dionex Chromeleon software version 6.70

The instrument precision is 0.7% relative standard deviation (RSD) or better for all the analytes. The method precision is 0.7% RSD or better for the all analytes with the exception of phosphate. For phosphate, in 6 individual determinations, its concentration is found to be less than 1 ppm and the method precision is 5.8% RSD. Finally, the Limit of Detection is 0.2 ppm (mg/L) or better for all the anions.

For both of the methods, the columns are cleaned after the analyses of 20 to 40 samples to get rid of contaminations from accumulated poly-anionic species and metals from the sample matrixes. This cleaning procedure is set up on an IC unit with programmed cleaning steps of 0.5 M sodium hydroxide, water and 2N hydrochloric acid.

EXAMPLE 1

Impurity Extraction at Room Temperature

Equal mass ratios of the quaternary organic-rich phase, pretreated as indicated in Table 1, and Bayer process liquor (~5 g each) are weighed into a container and vortex mixed for 60 seconds. The sample is left to phase separate for 1 hour and is then separated from the Bayer liquor phase. The quaternary organic-rich phase is analyzed by inductively coupled plasma optical emission spectrometer (ICP-OES) and the Bayer liquor rich phase is analyzed by Ion chromatography (IC) and total organic carbon (TOC) analysis. Samples of both the upper and lower phases also undergo Karl Fisher titrations to determine the water distribution in each phase. Using the Karl Fisher titration results, water transport can be corrected for in the ICP, IC and TOC results.

EXAMPLE 2

Separation Experiment at 60° C.

A quaternary organic compound pretreated as described in Table 1 (~5 g) is weighed into a centrifuge tube and then labeled and sealed. Once complete, the samples are placed in oven at 60° C. for 1 hour. Similarly, an equal mass of Bayer liquor is weighed into a separate centrifuge tube and is then labeled and sealed. Once complete, the Bayer liquor samples are placed into an oven at 60° C. for 1 hour. The Bayer liquor sample is then removed and poured into a quaternary organic compound sample tube and vortex mixed for 60 seconds. The combined samples are then placed into the oven for 40 minutes. The samples are then removed one at a time and analyzed in the same manner as the room temperature sample (Example 1).

EXAMPLE 3

Use of AMMOENG 101® to Remove Impurities from the Bayer Process

AMMOENG 101® is subjected to pre-extraction treatment to at least partially exchange the counter anion of the quaternary organic cation with hydroxide. The pre-extraction treatment used for each quaternary organic cation is shown in Table 1, below. A liquid phase containing AMMOENG 101® is intermixed by vortex mixing with a Bayer process stream having the composition shown in Table 2, below. This intermixing is effective to form a biphasic liquid/liquid mixture. The biphasic mixture comprises a primarily Bayer process phase and a primarily AMMOENG 101® phase. The primarily Bayer process phase is then separated from the primarily AMMOENG 101® phase by allowing phase separation for 1 hour and then mechanically separating the phases. The intermixing is effective to remove oxalate from the Bayer process stream. The amount of oxalate removed is shown in Table 3, below. In addition, the intermixing removes other organic and inorganic impurities including, organic carbon, acetate, formate, chloride and water. The amounts of these impurities removed are displayed in Tables 3 and 4 below.

EXAMPLE 4

Use of AMMOENG 110® to Remove Impurities from the Bayer Process

The general procedure of Example 3 is utilized, employing AMMOENG 110®. The intermixing is effective to remove oxalate from the Bayer process stream. The amount of oxalate removed is shown in Table 3, below. In addition, the intermixing removes other organic and inorganic impurities including, organic carbon, acetate, formate, chloride and water. The amounts of these impurities removed are shown in Tables 3 and 4 below.

EXAMPLE 5

Use of Trihexyltetradecylphopshonium chloride (Cyphos IL 101®) to Remove Impurities from the Bayer Process The general procedure of Example 3 is utilized, employing trihexyltetradecylphopshonium chloride (Cyphos IL 101®). The intermixing is effective to remove oxalate from the Bayer process stream. The amount of oxalate removed is shown in Table 3, below. In addition, the intermixing removes other organic and inorganic impurities including, organic carbon, acetate, formate, chloride and water. The amounts of these impurities removed are shown in Tables 3 and 4 below.

EXAMPLE 6

Use of Tetrabutylphosphonium chloride (Cyphos IL 164®) to Remove Impurities from the Bayer Process The general procedure of Example 3 is utilized, employing tetrabutylphosphonium chloride (Cyphos IL 164®). The intermixing is effective to remove oxalate from the Bayer process stream. The amount of oxalate removed is shown in Table 3, below. In addition, the intermixing removes other organic and inorganic impurities including, organic carbon, acetate, formate, chloride and water. The amounts of these impurities removed are shown in Tables 3 and 4 below.

EXAMPLE 7

Use of Tetradecyl(tributyl)phosphonium chloride (Cyphos IL 167®) to Remove Impurities from the Bayer Process The general procedure of Example 3 is utilized, employing tetradecyl(tributyl)phosphonium chloride (Cyphos IL 167®). The intermixing is effective to remove oxalate from the Bayer process stream. The amount of oxalate removed is displayed in Table 3, below. In addition, the intermixing removes other organic and inorganic impurities including, organic carbon, acetate, formate, chloride and water. The amounts of these impurities removed are shown in Tables 3 and 4 below.

EXAMPLE 8

Use of 1-Butyl-3-methylimidazolium chloride ([$C_4$mim]Cl) to Remove Impurities from the Bayer Process The general procedure of Example 3 is utilized, employing 1-Butyl-3-methylimidazolium chloride ([$C_4$mim]Cl). The intermixing is effective to remove oxalate from the Bayer process stream. The amount of oxalate removed is shown in Table 3, below. In addition, the intermixing removes other organic and inorganic impurities including, organic carbon, acetate, formate, chloride and water. The amounts of these impurities removed are shown in Tables 3 and 4 below.

EXAMPLE 9

Use of Tetrabutylammonium hydroxide ([$(C_4)_4$N][OH]) to Remove Impurities from the Bayer Process The general procedure of Example 3 is utilized, employing Tetrabutylammonium hydroxide ([$(C_4)_4$N][OH]), 40 wt % sol. in water. The intermixing is effective to remove oxalate from the Bayer process stream. The amount of oxalate removed is shown in Table 3, below. In addition, the intermixing removes other organic and inorganic impurities including, organic carbon, acetate, formate, chloride and water. The amounts of these impurities removed are shown in Tables 3 and 4 below.

EXAMPLE 10

Use of 10 wt % Tetrabutylammonium Hydroxide Dissolved in PEG 900 to Remove Impurities from the Bayer Process The general procedure of Example 3 is utilized, employing 10 wt % tetrabutylammonium hydroxide dissolved in PEG 900. The intermixing is effective to remove oxalate from the Bayer process stream. The amount of oxalate removed is shown in Table 3, below. In addition, the intermixing removes other organic and inorganic impurities including, organic carbon, acetate, formate, chloride and water. The amounts of these impurities removed are shown in Tables 3 and 4 below.

EXAMPLE 11

Use of Tetrabutylammonium chloride ([$(C_4)_4$N]Cl) to Remove Impurities from the Bayer Process The general procedure of Example 3 is utilized, employing tetrabutylammonium chloride ([$(C_4)_4$N]Cl). The intermixing is effective to remove oxalate from the Bayer process stream. The amount of oxalate removed is shown in Table 3, below. In addition, the intermixing removes other organic and inorganic impurities including, organic carbon, acetate, formate, chloride and water. The amounts of these impurities removed are shown in Tables 3 and 4 below.

EXAMPLE 12

Use of Tributylmethylammonium hydroxide ([$(C_4)_3(C_1)$N][OH]) to Remove Impurities from the Bayer Process The general procedure of Example 3 is utilized, employing tributylmethylammonium hydroxide ([$(C_4)_3(C_1)$N][OH]), 20 wt % sol. in water. The intermixing is effective to remove oxalate from the Bayer process stream. The amount of oxalate removed is shown in Table 3, below. In addition, the intermixing removes other organic and inorganic impurities including, organic carbon, acetate, formate, chloride and water. The amounts of these impurities removed are shown in Tables 3 and 4 below.

EXAMPLE 13

Use of Tetrapentylammonium hydroxide ([$(C_5)_4$N][OH]) to Remove Impurities from the Bayer Process The general procedure of Example 3 is utilized, employing tetrapentylammonium hydroxide ([$(C_5)_4$N][OH]), 20% solution in water. The intermixing is effective to remove oxalate from the Bayer process stream. The amount of oxalate removed is shown in Table 3, below. In addition, the intermixing removes other organic and inorganic impurities including, organic carbon, acetate, formate, chloride and water. The amounts of these impurities removed are shown in Tables 3 and 4 below.

EXAMPLE 14

Use of Dimethyl Dicoco Quaternary Ammonium Chloride (Adogen 462®) to Remove Impurities from the Bayer Process The general procedure of Example 3 is utilized, employing Adogen 462® (dimethyl dicoco quaternary ammonium chloride), 75% in aqueous isopropanol (dimethyl dicoco quaternary ammonium chloride). The intermixing is effective to remove oxalate from the Bayer process stream. The amount of oxalate removed is shown in Table 3, below. In addition, the intermixing removes other organic and inorganic impurities including, organic carbon, acetate, formate, chloride and water. The amounts of these impurities removed are shown in Tables 3 and 4 below.

EXAMPLE 15

Use of Stearamidopropyldimethyl-2-hydroxyethylammonium nitrate (Cyastat SN®) to Remove Impurities from the Bayer Process The general procedure of Example 3 is utilized, employing stearamidopropyldimethyl-2-hydroxyethylammonium nitrate (Cyastat SN®), 50% solution in a 50:50 isopropanol-water mixture. The intermixing is effective to remove oxalate from the Bayer process stream. The amount of oxalate removed is shown in Table 3, below. In addition, the intermixing removes other organic and inorganic impurities including, organic carbon, acetate, formate, chloride and water. The amounts of these impurities removed are shown in Tables 3 and 4 below.

EXAMPLE 16

Use of Ethyltetradecyldiundecyl Ammonium Chloride to Remove Impurities from the Bayer Process The general procedure of Example 3 is utilized, employing ethyltetradecyldiundecyl ammonium chloride. The intermixing is effective to remove oxalate from the Bayer process stream. The amount of oxalate removed is shown in Table 3, below. In addition, the intermixing removes other organic and inorganic impurities including, organic carbon, acetate, formate, chloride and water. The amounts of these impurities removed are shown in Tables 3 and 4 below.

EXAMPLE 17

Use of Tallowalkyltrimethyl Ammonium Chloride (Arquad T-50®) to Remove Impurities from the Bayer Process The general procedure of Example 3 is utilized, employing tallowalkyltrimethyl ammonium chloride (Arquad T-50®), 45-55% in aqueous isopropanol. The intermixing is effective to remove oxalate from the Bayer process stream. The amount of oxalate removed is shown in Table 3, below. In addition, the intermixing removes other organic and inorganic impurities including, organic carbon, acetate, formate, chloride and water. The amounts of these impurities removed are shown in Tables 3 and 4 below.

EXAMPLE 18

Use of Tetrahexylammonium Bromide to Remove Impurities from the Bayer Process

The general procedure of Example 3 is utilized, employing tetrahexylammonium bromide. The intermixing is effective to remove oxalate from the Bayer process stream. The amount of oxalate removed is shown in Table 3, below. In addition, the intermixing removes other organic and inorganic impurities including, organic carbon, acetate, formate, chloride and water. The amounts of these impurities removed are shown in Tables 3 and 4 below.

EXAMPLE 19

Use of Butylmethylpyrrolidinium bis(trifluoromethylsulfonyl)imide to Remove Impurities from the Bayer Process The general procedure of Example 3 is utilized, employing butylmethylpyrrolidinium bis(trifluoromethylsulfonyl) imide. The intermixing is effective to remove oxalate from the Bayer process stream. The amount of oxalate removed is shown in Table 3, below. In addition, the intermixing removes other organic and inorganic impurities including, organic carbon, acetate, formate, chloride and water. The amounts of these impurities removed are shown in Tables 3 and 4 below.

EXAMPLE 20

Use of N,N-dimethyl-N-dodecylglycine Betaine (EMPIGEN BB® Detergent) to Remove Impurities from the Bayer Process The general procedure of Example 3 is utilized, employing N,N-dimethyl-N-dodecylglycine Betaine (EMPIGEN BB® detergent). The intermixing is effective to remove oxalate from the Bayer process stream. The amount of oxalate removed is shown in Table 3, below. In addition, the intermixing removes other organic and inorganic impurities including, organic carbon, acetate, formate, chloride and water. The amounts of these impurities removed are shown in Tables 3 and 4 below.

EXAMPLE 21

Use of 1-Octyl-2,3-dimethylimidazolium Chloride to Remove Impurities from the Bayer Process The general procedure of Example 3 is utilized, employing 1-octyl-2,3-dimethylimidazolium chloride. The intermixing is effective to remove oxalate from the Bayer process stream. The amount of oxalate removed is shown in Table 3, below. In addition, the intermixing removes other organic and inorganic impurities including, organic carbon, acetate, formate, chloride and water. The amounts of these impurities removed are shown in Tables 3 and 4 below.

EXAMPLE 22

Use of Aliquat® HTA-1 to Remove Impurities from the Bayer Process

The general procedure of Example 3 is utilized, employing Aliquat® HTA-1. The intermixing is effective to remove oxalate from the Bayer process stream. The amount of oxalate removed is shown in Table 3, below. In addition, the intermixing removes other organic and inorganic impurities including, organic carbon, acetate, formate, chloride and water. The amounts of these impurities removed are shown in Tables 3 and 4 below.

EXAMPLE 23

Use of Tributyl-8-hydroxyoctylphosphonium Chloride to Remove Impurities from the Bayer Process The general procedure of Example 3 is utilized, employing tributyl-8-hydroxyoctylphosphonium chloride. The intermixing is effective to remove oxalate from the Bayer process stream. The amount of oxalate removed is displayed in Table 3, below. In addition, the intermixing removes other organic and inorganic impurities including, organic carbon, acetate, formate, chloride and water. The amounts of these impurities removed are displayed in Tables 3 and 4 below.

EXAMPLE 24

Use of Tetrabutylphosphonium Hydroxide to Remove Impurities from the Bayer Process The general procedure of Example 3 is utilized, employing tetrabutylphosphonium hydroxide, 40 wt % solution in water. The intermixing is effective to remove oxalate from the Bayer process stream. The amount of oxalate removed is shown in Table 3, below. In addition, the intermixing removes other organic and inorganic impurities including, organic carbon, acetate, formate, chloride and water. The amounts of these impurities removed are shown in Tables 3 and 4 below.

EXAMPLE 25

Use of Dodecyltrimethyl Ammonium Chloride to Remove Impurities from the Bayer Process The general procedure of Example 3 is utilized, employing dodecyltrimethyl ammonium chloride. The intermixing is effective to remove oxalate from the Bayer process stream. The amount of oxalate removed is shown in Table 3, below. In addition, the intermixing removes other organic and inorganic impurities including, organic carbon, acetate, formate, chloride and water. The amounts of these impurities removed are shown in Tables 3 and 4 below.

EXAMPLE 26

Use of Benzyldimethylcoco Ammonium Chloride to Remove Impurities from the Bayer Process The general procedure of Example 3 is utilized, employing benzyldimethylcoco ammonium chloride. The intermixing is effective to remove oxalate from the Bayer process stream. The amount of oxalate removed is shown in Table 3, below. In addition, the intermixing removes other organic and inorganic impurities including, organic carbon, acetate, formate, chloride and water. The amounts of these impurities removed are shown in Tables 3 and 4 below.

EXAMPLE 27

Water Removal from Bayer Liquor

In the water removal method, the quaternary organic cations that are liquid at room temperature are used without dilution. Quaternary organic cations that are solid at room temperature are used as 70 wt % aqueous solutions. Approximately 5 g of the quaternary organic cation is weighed into a centrifuge tube and then labeled and sealed. Once complete, the samples are placed in oven at 60° C. for 1 hour. Similarly, an equal mass of Bayer liquor is weighed into a separate centrifuge tube and is then labeled and sealed. Once complete, the Bayer liquor samples are placed into an oven at 60° C. for 1 hour. The Bayer liquor sample is then removed and poured into a quaternary organic compound sample tube and vortex mixed for 60 seconds. The combined samples are then placed into the oven for 60 minutes. The samples are then removed one at a time, phase separated (the two phases are weighed) and analyzed by Karl Fisher Titrations. Table 4 shows examples of water removal from Bayer liquor using various organic salts.

EXAMPLE 28

Variation of Ratio of Amount of Organic Salt to Bayer Process Stream

The data provided in Table 5 illustrates that different levels of impurities may be removed using differing ratios of organic salt to Bayer process stream. Other ratios are effective for other situations.

EXAMPLE 29

50 wt % Octyl(tributyl)phosphonium chloride (Cyphos 253®), Tetradecyl(tributyl)phosphonium chloride (Cyphos IL 167®), or Tetrahexylammonium chloride dissolved in Toluene to Remove Impurities from the Bayer Process The general procedure of Example 3 is utilized, employing 50 wt % octyl(tributyl)phosphonium chloride (Cyphos 253®), tetradecyl(tributyl)phosphonium chloride (Cyphos IL 167®), or tetrahexylammonium chloride dissolved in Toluene. The intermixing is effective to remove organic impurities from the Bayer process stream. The amount of organic impurities removed is shown in Table 3, below.

EXAMPLE 30

50 wt % Octyl(tributyl)phosphonium chloride (Cyphos 253®), Tetradecyl(tributyl)phosphonium chloride (Cyphos IL 167®), or Tetrahexylammonium chloride Dissolved in 1-Octanol to Remove Impurities from the Bayer Process The general procedure of Example 3 is utilized, employing 50 wt % octyl(tributyl)phosphonium chloride (Cyphos 253®), tetradecyl(tributyl)phosphonium chloride (Cyphos IL 167®), or tetrahexylammonium chloride dissolved in 1-Octanol. The intermixing is effective to remove organic impurities from the Bayer process stream. The amount of organic impurities removed is shown in Table 3, below.

TABLE 1

Quaternary Organic Cations Used for Impurities Removal from Bayer Liquor

| No. | Materials used in performance experiments | Pre-extraction treatment |
|---|---|---|
| 1 | AMMOENG 101 ®, FIG. 2 | Method 1 |
| 2 | AMMOENG 110 ®, FIG. 2 | Method 1 |
| 3 | Trihexyltetradecylphopshonium chloride (Cyphos IL 101 ®) | Method 1 |
| 4 | Tetrabutylphosphonium chloride (Cyphos IL 164 ®) | Method 1 |
| 5 | Tetradecyl(tributyl)phosphonium chloride (Cyphos IL 167 ®) | Method 1 |
| 6 | 1-Butyl-3-methylimidazolium chloride ([C$_4$mim]Cl) | Method 1 |
| 7 | Tetrabutylammonium hydroxide ([(C$_4$)$_4$N][OH]), 40 wt % sol. in water | Method 1<br>Method 3<br>Method 5 |
| 8 | Tetrabutylammonium chloride ([(C$_4$)$_4$N]Cl) | Method 1 |
| 9 | Tributylmethylammonium hydroxide ([(C$_4$)$_3$(C$_1$)N][OH]), 20 wt % sol. in water | Method 1 |
| 10 | Tetrapentylammonium hydroxide ([(C$_5$)$_4$N][OH]), 20% solution in water | Method 1 |
| 11 | Adogen 462 ® (dimethyl dicoco quaternary ammonium chloride), 75% in aqueous isopropanol (dimethyl dicoco quaternary ammonium chloride), FIG. 2- | Method 2 |
| 12 | Cyastat SN ® (Stearamidopropyldimethyl-2-hydroxyethylammonium nitrate), 50% solution in a 50:50 isopropanol-water mixture | Method 2 |
| 13 | Ethyltetradecyldiundecyl ammonium chloride | Method 2 |
| 14 | Arquad T-50 ® (Tallowalkyltrimethyl ammonium chloride), 45-55% in aqueous isopropanol | Method 2 |

TABLE 1-continued

Quaternary Organic Cations Used for Impurities Removal from Bayer Liquor

| No. | Materials used in performance experiments | Pre-extraction treatment |
|---|---|---|
| 15 | Tetrahexylammonium bromide | Method 1 |
| 16 | Butylmethylpyrrolidinium bis(trifluoromethylsulfonyl)imide | Method 2 |
| 17 | EMPIGEN BB ® detergent (N,N-dimethyl-N-dodecylglycine betaine) | Method 1 |
| 18 | 1-Octyl-2,3-dimethylimidazolium chloride | Method 1 |
| 19 | 10 wt % Tetrabutylammonium hydroxide dissolved in PEG 900 | Method 2 |
| 20 | Aliquat ® HTA-1 | Method 2 |
| 21 | Tributyl-8-hydroxyoctylphosphonium chloride | Method 2 |
| 22 | Tetrabutylphosphonium hydroxide, 40 wt % solution in water | Method 2 |
| 23 | Arquad 12-50H ® (Dodecyltrimethyl ammonium chloride), 45-55 wt % in aqueous isopropanol | Method 1 |
| 24 | Arquad DMCB-80 ® (Benzyldimethylcoco ammonium chloride), 75-85 wt % in aqueous isopropanol | Method 1 |
| 25 | Octyl(tributyl)phosphonium chloride (Cyphos 253 ®), 50% solution in Toluene | Method 4 |
| 26 | Tetradecyl(tributyl)phosphonium chloride (Cyphos IL 167 ®), 50% solution in Toluene | Method 4 |
| 27 | Tetrahexylammonium chloride, 50% solution in Toluene | Method 4 |
| 28 | Octyl(tributyl)phosphonium chloride (Cyphos 253 ®), 50% solution in 1-Octanol | Method 4 |
| 29 | Tetradecyl(tributyl)phosphonium chloride (Cyphos IL 167 ®), 50% solution in 1-Octanol | Method 4 |
| 30 | Tetrahexylammonium chloride, 50% solution in 1-Octanol | Method 4 |

TABLE 2

Composition of Blank Spent Bayer Liquor Prior to Removal of Impurities
(Alumina = 94.78 g/L as $Al_2O_3$, Total Caustic = 227.62 g/L as $Na_2CO_3$, Soda = 269.68 g/L as $Na_2CO_3$).

| | TOC (g/L) | Oxalate/Succinate (g/L) | Acetate (g/L) | Formate (g/L) | Chloride (g/L) |
|---|---|---|---|---|---|
| Blank liquor sample | 9.12 | 2.46 | 5.77 | 2.65 | 7.00 |

TABLE 3

Percentage of Organic and Inorganic Impurities Removed

| Sample | % TOC Removal | % Oxalate/Succinate Removal | % Acetate Removal | % Formate Removal | % Chloride Removal |
|---|---|---|---|---|---|
| AMMOENG 101 ® | 36.9 | 19.9 | 46.2 | 50.9 | 69.3 |
| AMMOENG 101 ® @ 60° C. | 38.7 | 18.5 | 46.4 | 50.2 | 67.1 |
| AMMOENG 110 ® | 24.8 | 31.6 | 51.3 | 57.5 | 52.0 |
| AMMOENG 110 ® @ 60° C. | 24.2 | 33.3 | 47.8 | 56.9 | 49.6 |
| Trihexyltetradecylphopshonium chloride (Cyphos IL 101 ®) | 31.0 | 13.8 | 38.2 | 43.1 | −26.1* |
| Tetrabutylphosphonium chloride (Cyphos IL 164 ®) | 31.6 | 22.7 | 75.0 | 81.0 | 22.2 |
| Tetradecyl(tributyl)phosphonium chloride (Cyphos IL 167 ®) | 6.1 | 10.9 | 52.5 | 58.5 | −9.2* |
| 1-Butyl-3-methylimidazolium chloride ([$C_4$mim]Cl) | 5.7 | 10.5 | 62.8 | 58.2 | 74.6 |
| Tetrabutylammonium hydroxide ([$(C_4)_4$N][OH]), 40 wt % sol. in water | 63 | 48.2 | 85.6 | 91.7 | 96.1 |
| 10 wt % Tetrabutylammonium hydroxide dissolved in PEG 900 | 14.5 | 1.7 | 14.5 | 16 | 31.6 |
| 40 wt % Tetrabutylammonium hydroxide | 46.6 | 50.6 | 79.9 | 84.7 | 88.3 |
| Tetrabutylammonium hydroxide (Method 2) | 20.0 | | | | |
| Tetrabutylammonium chloride ([$(C_4)_4$N]Cl) | 29.8 | 38.8 | 84.0 | 88.6 | 46.4 |

TABLE 3-continued

Percentage of Organic and Inorganic Impurities Removed

| Sample | % TOC Removal | % Oxalate/Succinate Removal | % Acetate Removal | % Formate Removal | % Chloride Removal |
| --- | --- | --- | --- | --- | --- |
| Tributylmethylammonium hydroxide ([(C$_4$)$_3$(C$_1$)N][OH]), 20 wt % sol. in water | 63.1 | 54.4 | 90.0 | 93.8 | 98.8 |
| Tributylmethylammonium hydroxide | 16.9 | | | | |
| Tetrapentylammonium hydroxide ([(C$_5$)$_4$N][OH]), 20% solution in water | 72.4 | 67.2 | 96.8 | 99.2 | 101.8 |
| Tetrapentylammonium hydroxide ([(C$_5$)$_4$N][OH]) | 37.1 | | | | |
| Adogen 462 ® (dimethyl dicoco quaternary ammonium chloride), 75% in aqueous isopropanol (dimethyl dicoco quaternary ammonium chloride) | 31.5 | 18.6 | 60.7 | 66.1 | 20.0 |
| Cyastat SN ® (Stearamidopropyldimethyl-2-hydroxyethylammonium nitrate) 50% solution in a 50:50 isopropanol-water mixture | −7.2* | 8.1 | 37.7 | 41.6 | 60.9 |
| Ethyltetradecyldiundecyl ammonium chloride | 0.1 | 7.7 | 0.4 | 11.7 | 13.6 |
| Arquad T-50 ® (Tallowalkyltrimethyl ammonium chloride), 45-55% in aqueous isopropanol | 20.0 | 16.1 | 59.1 | 60.5 | 23.9 |
| Tetrahexylammonium Bromide | 3.4 | 0.4 | 3.5 | 10.8 | 36.4 |
| Butylmethylpyrrolidinium bis(trifluoromethylsulfonyl)imide | 0.6 | 2.7 | −3.7 | 2.3 | 3.7 |
| 'EMPIGEN BB' Detergent (N,N-dimethyl-N-dodecylglycine betaine) | 45.4 | 36.3 | 66.2 | 74.4 | 35.1 |
| 'EMPIGEN BB' Detergent (N,N-dimethyl-N-dodecylglycine betaine) (Method 1) | 27.6 | | | | |
| 1-Octyl-2,3-dimethyl imidazolium chloride | 45.4 | 36.3 | 66.2 | 74.4 | 35.1 |
| 1-Octyl-2,3-dimethyl imidazolium chloride (Method 1) | 21.8 | | | | |
| Aliquat ® HTA-1 | 46.8 | 34 | 71.1 | 78.8 | 35.9 |
| Aliquat ® HTA-1 (Method 1) | 6.4 | | | | |
| Tributyl (8-hydroxyoctyl)phosphonium chloride | 38 | 0.1 | 48 | 64.7 | 31.2 |
| Tetrabutylphosphonium hydroxide, 40 wt % solution in water | 67.7 | 53.38 | 83.93 | 91.93 | 96.48 |
| Tetrabutylphosphonium hydroxide | 21.7 | | | | |
| Dodecyltrimethyl ammonium chloride | 15.8 | 28.7 | 67.7 | 69.4 | 75.6 |
| Benzyldimethylcoco ammonium chloride | 40.5 | 24.9 | 61.6 | 67.2 | 50.2 |
| Octyl(tributyl)phosphonium chloride (Cyphos 253 ®), 50% solution in Toluene | 23% | | | | |
| Tetradecyl(tributyl)phosphonium chloride (Cyphos IL 167 ®), 50% solution in Toluene | 20% | | | | |
| Tetrahexylammonium chloride, 50% solution in Toluene | 21% | | | | |
| Octyl(tributyl)phosphonium chloride (Cyphos 253 ®), 50% solution in 1-Octanol | 28% | | | | |
| Tetradecyl(tributyl)phosphonium chloride (Cyphos IL 167 ®), 50% solution in 1-Octanol | 27% | | | | |
| Tetrahexylammonium chloride, 50% solution in 1-Octanol | 27% | | | | |

TABLE 4

Percentage of Water Removed

| Sample | Water Removed, wt % |
|---|---|
| AMMOENG 110 ® | 23.02 |
| AMMOENG 101 ® | 34.49 |
| Cyphos IL 108 ® | 23.06 |
| 1-Butyl-3-methylimidazolium chloride 70% | 34.05 |
| Tetrabutylammonium chloride 70% | 4.40 |
| 1-Octyl-2,3-dimethylimidazolium chloride 70% | 20.90 |
| 1-Butyl-1-methylpyrolidonium chloride 70% | 34.74 |

TABLE 5

Percentage of Organic and Inorganic Impurities Removed for various weight/weight ratios of organic salt:Bayer liquor

| Sample: Tetrabutylphosphonium hydroxide | % TOC Removal | % Oxalate/Succinate Removal | % Acetate Removal | % Formate Removal | % Chloride Removal |
|---|---|---|---|---|---|
| ($[(C_4)_4P][OH]$:Liquor) (0.1:1) | 14.8 | −1.0 | 11.9 | 15.6 | 35.9 |
| ($[(C_4)_4P][OH]$:Liquor) (0.25:1) | 27.1 | 3.0 | 36.0 | 46.2 | 72.0 |
| ($[(C_4)_4P][OH]$:Liquor) (0.33:1) | 43.3 | 13.1 | 47.6 | 57.6 | 80.4 |
| ($[(C_4)_4P][OH]$:Liquor) (0.5:1) | 55.6 | 31.2 | 64.9 | 74.6 | 89.6 |
| ($[(C_4)_4P][OH]$:Liquor) (1:1) | 69.6 | 52.1 | 82.9 | 89.8 | 96.2 |
| ($[(C_4)_4P][OH]$:Liquor) (2:1) | 77.3 | 69.3 | 91.8 | 95.0 | 98.3 |
| ($[(C_4)_4P][OH]$:Liquor) (3:1) | 77.3 | 75.9 | 94.8 | 96.7 | 98.8 |
| ($[(C_4)_4P][OH]$:Liquor) (4:1) | 62.3 | 79.8 | 95.7 | 97.2 | 95.1 |

What is claimed is:

1. A method of purifying a Bayer process stream, comprising:
    providing a liquid phase that comprises an organic salt, the liquid phase including at least 1 wt. % of the organic salt, based on the weight of the Bayer process stream, wherein the organic salt comprises a quaternary organic cation, and wherein the liquid phase is at least partially immiscible with the Bayer process stream;
    intermixing the Bayer process stream with the liquid phase in an amount effective to form a biphasic liquid/liquid mixture, wherein the biphasic liquid/liquid mixture comprises a primarily Bayer process phase and a primarily organic salt phase; and
    at least partially separating the primarily Bayer process phase from the primarily organic salt phase to form a separated primarily Bayer process phase having a reduced oxalate concentration and a separated primarily organic salt phase
    wherein the intermixing is effective to reduce the concentration of oxalate in the Bayer process stream by extraction from the Bayer process stream into the primarily organic salt phase.

2. The method of claim 1, wherein the liquid phase is an aqueous liquid phase.

3. The method of claim 2, wherein the aqueous liquid phase comprises from about 1% to about 97% water, by weight based on total weight of aqueous liquid phase.

4. The method of claim 1, wherein the liquid phase comprises a solvent.

5. The method of claim 4, wherein the solvent consists of a member of the group consisting of aromatic hydrocarbons, aliphatic alcohols, aromatic alcohols, halogenated hydrocarbons and combinations thereof.

6. The method of claim 1, wherein the liquid phase comprises a diluent.

7. The method of claim 1, wherein the liquid phase includes at least about 10% by weight of the organic salt, based on the weight of the Bayer process stream.

8. The method of claim 1, comprising intermixing the Bayer process stream with the liquid phase at a weight ratio of Bayer process stream to liquid phase in a range of about 1000:1 to about 1:10, by weight.

9. The method of claim 1, wherein the quaternary organic cation is selected from the group consisting of phosphonium, ammonium, imidazolium, pyrrolidinium, quinolinium, pyrazolium, oxazolium, thiazolium, isoquinolinium, and piperidinium.

10. The method of claim 9, wherein the quaternary organic cation is phosphonium.

11. The method of claim 10, wherein the organic salt is selected from the group consisting of trihexyltetradecylphosphonium chloride, tetrabutylphosphonium chloride, tetradecyl(tributyl)phosphonium chloride, tributyl (8- hydroxyoctyl)phosphonium chloride and octyl(tributyl)phosphonium.

12. The method of claim 9, wherein the quaternary organic cation is ammonium.

13. The method of claim 12, wherein the organic salt is selected from the group consisting of tetrabutylammonium hydroxide, tetrabutylammonium chloride, stearamidopropyldimethyl-2-hydroxyethylammonium nitrate, ethyltetradecyldiundecyl ammonium chloride, tetrahexylammonium bromide, dodecyltrimethyl ammonium chloride, benzyldimethylcoco ammonium chloride, N,N-dimethyl-N-dodecylglycine betaine, Adogen 462®, Aliquat® HTA-1, and tallowalkyltrimethyl ammonium chloride.

14. The method of claim 9, wherein the quaternary organic cation is selected from the group consisting of:

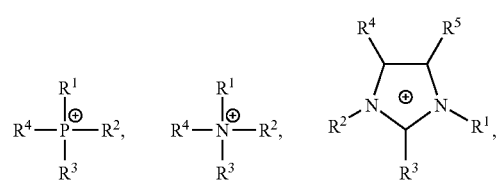

-continued

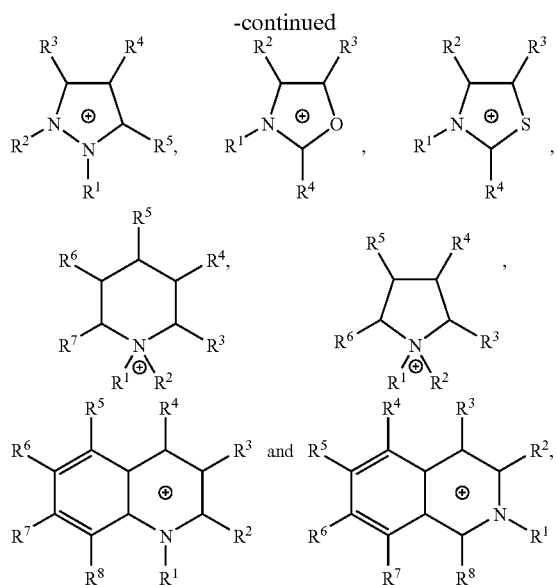

wherein R¹ through R⁸ are each independently hydrogen or an optionally substituted $C_1$-$C_{50}$ alkyl group, where the optional substituents are selected from alkyl, alkenyl, alkynyl, alkoxyalkyl, carboxylic acid, alcohol, carboxylate, hydroxyl, and aryl.

15. The method of claim 1, wherein the intermixing comprises feeding the Bayer process stream and the liquid phase into an in-line mixer.

16. The method of claim 1, wherein the intermixing comprises feeding the Bayer process stream and the liquid phase into a continuous mixer/settler unit.

17. The method of claim 1, wherein the Bayer process stream is a pregnant liquor stream from a thickener overflow.

18. The method of claim 1, wherein the Bayer process stream comprises a strong liquor.

19. The method of claim 1, wherein the Bayer process stream comprises a spent liquor.

20. The method of claim 1, further comprising heating the biphasic mixture to enhance a separation rate of the primarily Bayer process phase from the primarily organic salt phase.

21. The method of claim 1, further comprising intermixing the separated primarily Bayer process phase with a second Bayer process stream.

22. The method of claim 1, further comprising cooling the separated primarily Bayer process phase to precipitate at least a portion of aluminum hydroxide dissolved therein.

23. The method of claim 1, wherein the intermixing is effective to reduce the concentration of at least one organic impurity in the Bayer process stream, wherein the organic impurity is selected from formate, acetate, and organic carbon.

24. The method of claim 1, wherein the intermixing is effective to reduce the concentration of at least one inorganic impurity in the Bayer process stream.

25. The method of claim 24, wherein the inorganic impurity is chloride.

26. The method of claim 1, wherein the intermixing is effective to reduce the level of water in the Bayer process stream.

27. The method of claim 1, wherein the separated primarily organic salt phase comprises oxalate and at least one organic impurity selected from formate, acetate, and organic carbon.

28. A method of purifying a Bayer process stream, comprising:

providing a liquid phase that comprises an organic salt, wherein the organic salt comprises a quaternary organic cation selected from the group consisting of phosphonium, ammonium, imidazolium, pyrrolidinium, quinolinium, pyrazolium, oxazolium, thiazolium, isoquinolinium, and piperidinium, the liquid phase at least partially immiscible with the Bayer process stream, and wherein the liquid phase includes at least 1% by weight of the organic salt, based on the weight of the Bayer process stream;

intermixing the Bayer process stream with the liquid phase in an amount effective to form a biphasic liquid/liquid mixture, wherein the biphasic liquid/liquid mixture comprises a primarily Bayer process phase and a primarily organic salt phase; and at least partially separating the primarily Bayer process phase from the primarily organic salt phase to form a separated primarily Bayer process phase having a reduced oxalate concentration and a separated primarily organic salt phase wherein the intermixing is effective to reduce the concentration of oxalate in the Bayer process stream by extraction from the Bayer process stream into the primarily organic salt phase.

29. The method of claim 28, wherein the liquid phase is an aqueous liquid phase.

30. The method of claim 28, wherein the aqueous liquid phase comprises from about 1% to about 97% water, by weight based on total weight of aqueous liquid phase.

31. The method of claim 28, wherein the aqueous phase comprises a solvent.

32. The method of claim 28, wherein the liquid phase comprises a diluent.

33. The method of claim 32, wherein the diluent comprises polyethyleneoxide.

34. The method of claim 28, wherein the liquid phase includes at least about 10% by weight of the organic salt, based on the weight of the Bayer process stream.

35. The method of claim 28, comprising intermixing the Bayer process stream with the liquid phase at a weight ratio of Bayer process stream to liquid phase in a range of about 1000:1 to about 1:10, by weight.

36. The method of claim 28, wherein the quaternary organic cation is phosphonium.

37. The method of claim 36, wherein the organic salt is selected from the group consisting of trihexyltetradecylphopshonium chloride, tetrabutylphosphonium chloride, tetradecyl(tributyl)phosphonium chloride, Aliquat® HTA-1, tributyl (8-hydroxyoctyl)phosphonium chloride and octyl (tributyl)phosphonium.

38. The method of claim 28, wherein the quaternary organic cation is ammonium.

39. The method of claim 38, wherein the organic salt is selected from the group consisting of tetrabutylammonium hydroxide, tetrabutylammonium chloride, stearamidopropyldimethyl-2-hydroxyethylammonium nitrate, ethyltetradecyldiundecyl ammonium chloride, tetrahexylammonium bromide, dodecyltrimethyl ammonium chloride, benzyldimethylcoco ammonium chloride, N,N-dimethyl-N-dodecylglycine betaine, Adogen 462®, Aliquat® HTA-1, and tallowalkyltrimethyl ammonium chloride.

40. The method of claim 28, wherein the quaternary organic cation is selected from the group consisting of:

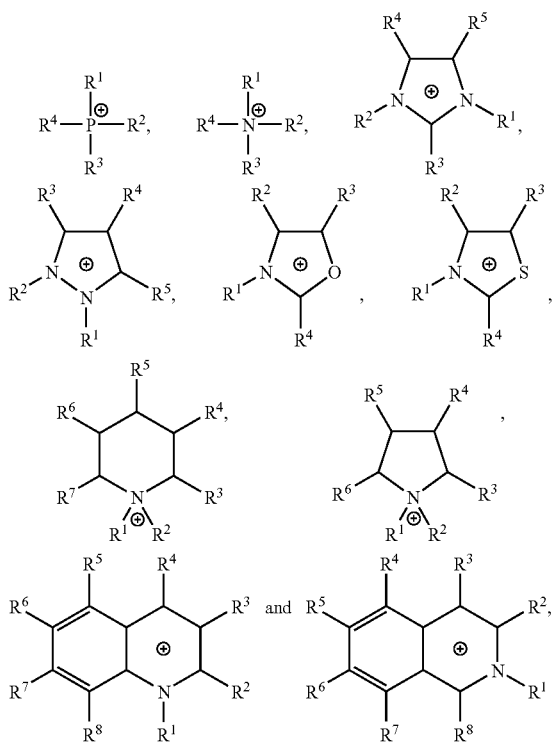

wherein $R^1$ through $R^8$ are each independently hydrogen or an optionally substituted $C_1$-$C_{50}$ alkyl group, where the optional substituents are selected from alkyl, alkenyl, alkynyl, alkoxyalkyl, carboxylic acid, alcohol, carboxylate, hydroxyl, and aryl.

41. The method of claim 28, wherein the intermixing comprises feeding the Bayer process stream and the liquid phase into an in-line mixer.

42. The method of claim 28, wherein the intermixing comprises feeding the Bayer process stream and the liquid phase into a continuous mixer/settler unit.

43. The method of claim 28, wherein the Bayer process stream is a pregnant liquor stream from a thickener overflow.

44. The method of claim 28, wherein the Bayer process stream comprises a strong liquor.

45. The method of claim 28, wherein the Bayer process stream comprises a spent liquor.

46. The method of claim 28, further comprising heating the biphasic mixture to enhance a separation rate of the primarily Bayer process phase from the primarily organic salt phase.

47. The method of claim 28, further comprising intermixing the separated primarily Bayer process phase with a second Bayer process stream.

48. The method of claim 28, further comprising cooling the separated primarily Bayer process phase to precipitate at least a portion of aluminum hydroxide dissolved therein.

49. The method of claim 28, wherein the intermixing is effective to reduce the concentration of at least one organic impurity in the Bayer process stream, wherein the organic impurity is selected from formate, acetate, and organic carbon.

50. The method of claim 28, wherein the intermixing is effective to reduce the concentration of at least one inorganic impurity in the Bayer process stream.

51. The method of claim 50, wherein the inorganic impurity is chloride.

52. The method of claim 28, wherein the intermixing is effective to reduce the level of water in the Bayer process stream.

53. The method of claim 28, wherein the separated primarily organic salt phase comprises oxalate and at least one organic impurity selected from formate, acetate, and organic carbon.

* * * * *